United States Patent [19]

Shaw

[11] 4,061,040

[45] Dec. 6, 1977

[54] APPARATUS FOR MEASURING ROTATION RATES WITH ACOUSTIC WAVES

[75] Inventor: Herbert J. Shaw, Stanford, Calif.

[73] Assignee: The United States of America as represented by the Secretary of the Navy, Washington, D.C.

[21] Appl. No.: 702,175

[22] Filed: July 2, 1976

[51] Int. Cl.² ........................ G01P 3/42; G01C 21/00
[52] U.S. Cl. .................................................. 73/505
[58] Field of Search ................ 73/504, 505, 67.5 R, 73/67.6

[56] References Cited

U.S. PATENT DOCUMENTS 3,232,120 2/1966 Ensley .................................. 73/505
3,905,235 9/1975 Shaw ................................... 73/505

Primary Examiner—James J. Gill
Attorney, Agent, or Firm—R. S. Sciascia; Charles D. B. Curry; James M. Skorich

[57] ABSTRACT

A measuring apparatus for determining the rotational velocity of a solid spherical or cylindrical object by propagating an acoustic wave through the object. The inward face of the surface of the object is used to reflect the wave, thereby causing it to make multiple transits through the object. Multiple transits provide a large time factor which allows the apparatus to achieve a high degree of sensitivity in measuring small rate changes and low rotation rates.

8 Claims, 8 Drawing Figures

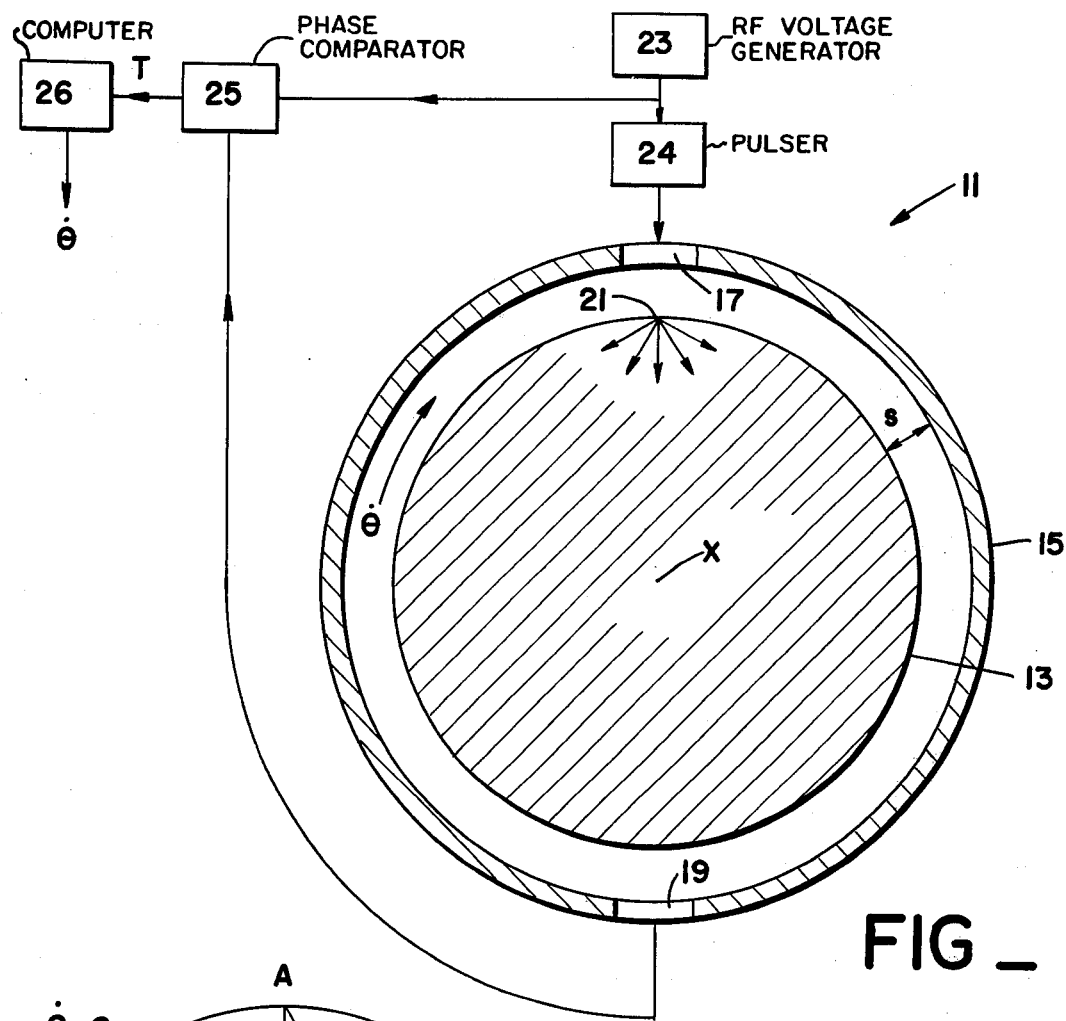
FIG_1
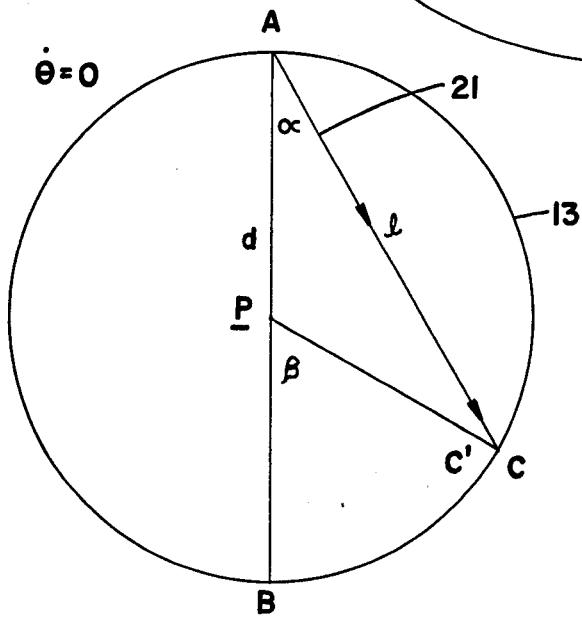
FIG_2
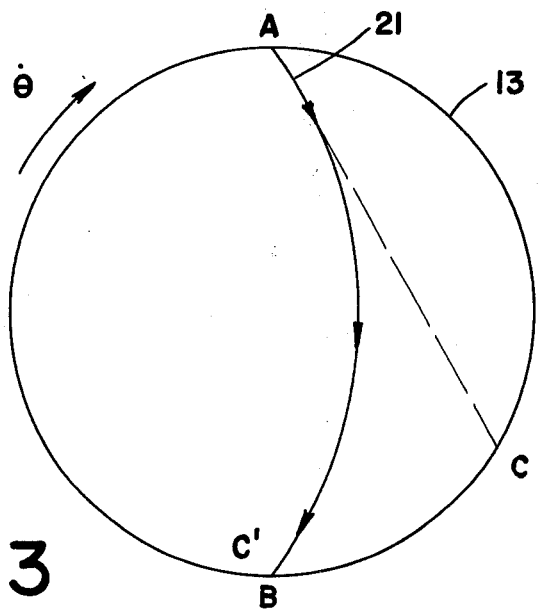
FIG_3

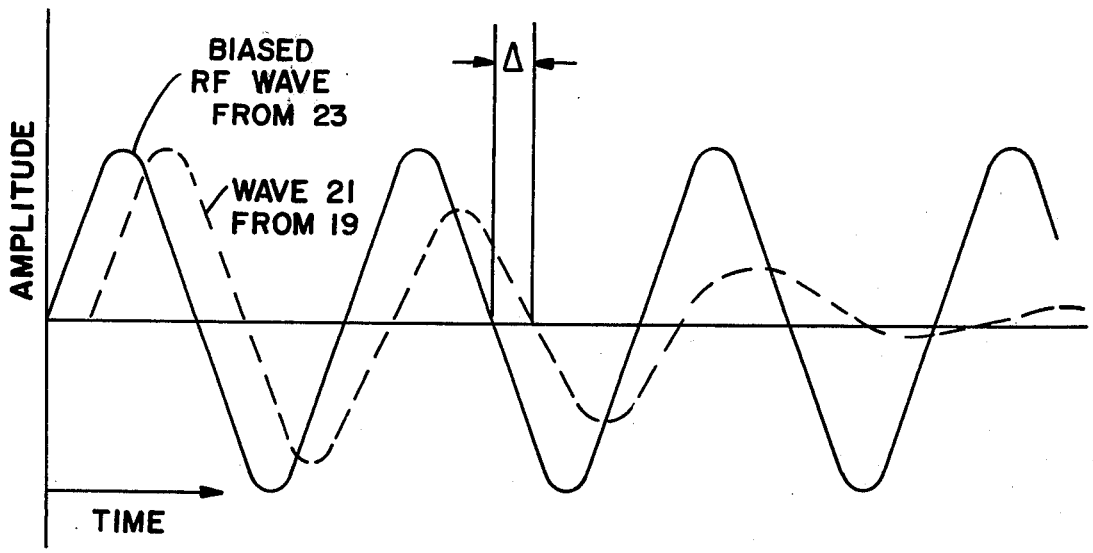
FIG_4
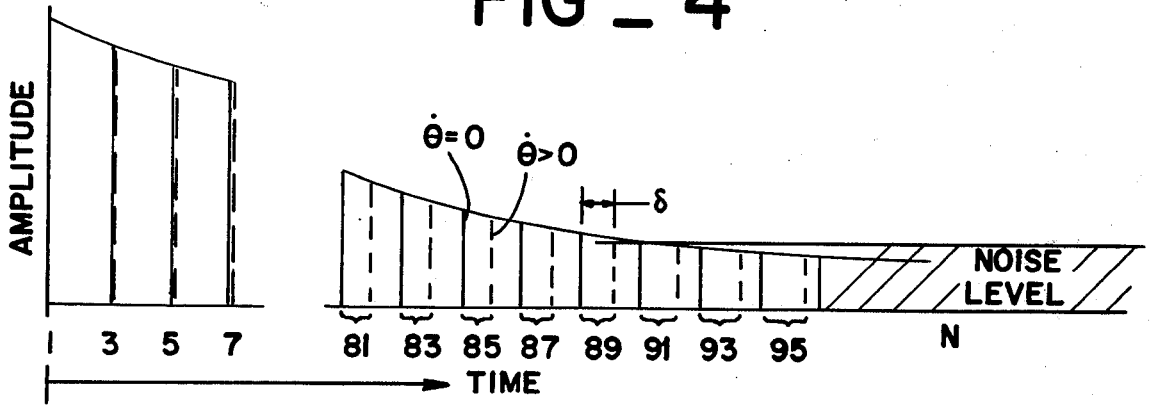
FIG_6
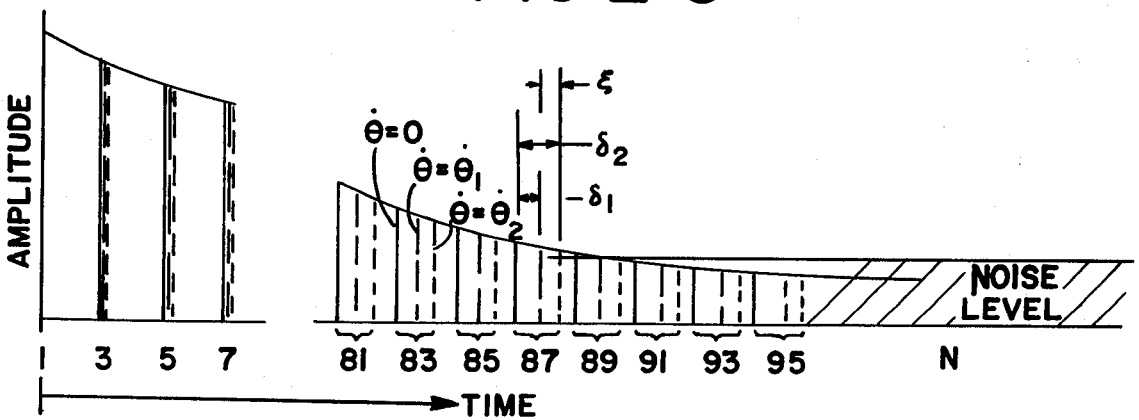
FIG_7

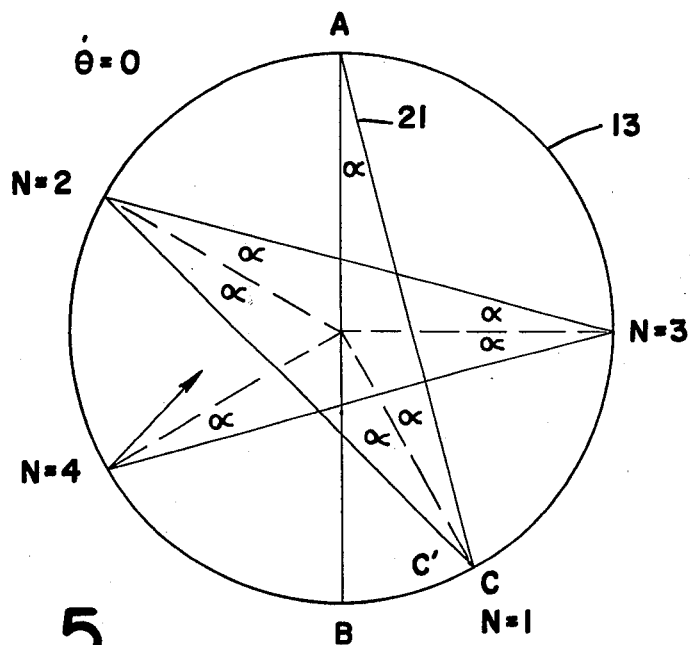
FIG _ 5
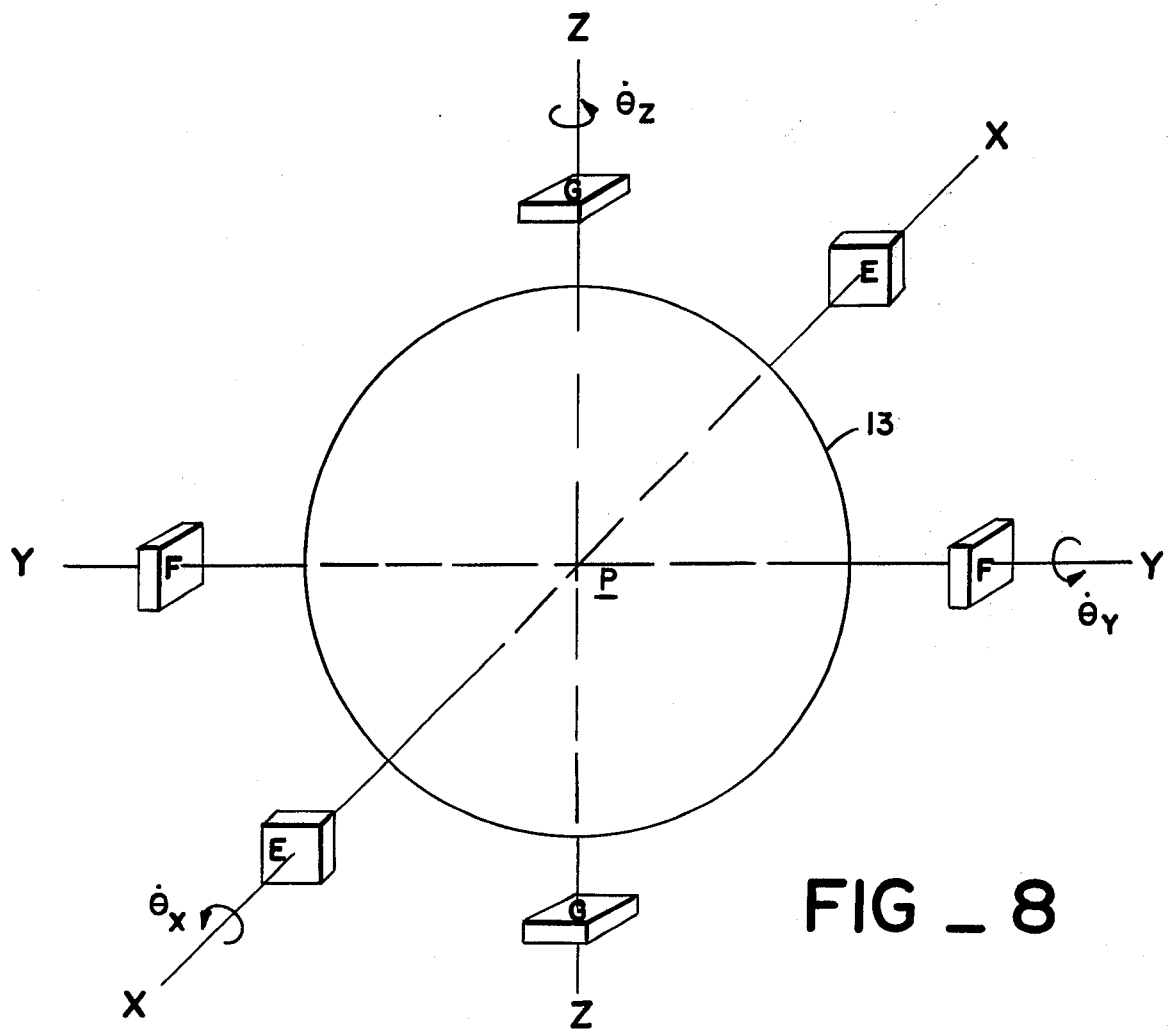
FIG _ 8

4,061,040

APPARATUS FOR MEASURING ROTATION RATES WITH ACOUSTIC WAVES

BACKGROUND OF THE INVENTION

1. Field of the Invention

The subject invention relates to the field of measuring devices, and more particularly to devices for measuring the rotation rate of spherical objects with acoustic waves.

2. Description of the Prior Art

Presently, the rotational velocity of spherical objects is measured using optical methods or electrical fields. Optical methods require that the object be marked. Electrical methods require that the object be marked or that it be non-spherical, i.e., have an elliptical cross section, because such devices gauge rotation rate by sensing the variation of the capacitance with the distance between the object and an adjacent housing as a function of time.

The present invention avoids the aforementioned problems inherent in the prior art by introducing an acoustic wave at the surface of an object that propagates through the object. No contact is made with the object, it is not marked, it need not be electrically charged, and the object may be spherical.

SUMMARY OF THE INVENTION

The present invention introduces an acoustic wave at the periphery of the solid spherical object whose rotation rate is to be measured. The wave makes multiple transits through the object by means of reflecting off of the object's concave, inward facing surface. The time required for the wave to complete a given number of transits is ascertained by means of a phase comparator which compares the phase of the reflected acoustic wave with that of the RF voltage generator employed to generate the acoustic wave. This time is then used along with the number of transits, path length, and the velocity of propagation to obtain the rotation rate of the object. The apparatus provides accurate measurements and increased sensitivity for relatively low rotation rates and for small rate changes at low rotation rates because as a direct result of using the transit time for a large number of transits, the concomitant phase differences are readily discernable.

STATEMENT OF THE OBJECTS OF THE INVENTION

An object of the present invention is to provide an apparatus for measuring the rotation rate of an object without marking, making contact with, or electrically charging the object.

Another object of the present invention is to provide an apparatus which can measure the rotation rate of a perfectly spherical object.

Yet another object of the present invention is to provide an apparatus which can measure the rotation rate of a cylinder about its axis of revolution.

Still another object of the present invention is to provide an apparatus which can measure the rotation rate of an object rotating about one axis.

A further object of the present invention is to provide an apparatus capable of measuring the respective rotation rate components of an object rotating about three axes.

Another object of the present invention is to provide an apparatus for accurately measuring the rotation rate of an object even when the rotation rate is relatively low.

Yet another object of the present invention is to provide an apparatus for measuring the rotation rate of an object which is very sensitive to small changes in the rotation rate even when the rotation rate is relatively low.

Still another object of the present invention is to provide an apparatus which uses multiple transits of an acoustic wave through the object whose rotational rate is to be measured in order to obtain a large time factor.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a cross section of the preferred embodiment of the present invention;

FIG. 2 is a schematic drawing of the present invention showing the geometrical relationships between the path of a given ray and the sphere whose rotational rate is to be determined where the sphere is not rotating;

FIG. 3 is a schematic drawing of the present invention showing the path of a particular ray relative to a stationary coordinate system where the sphere whose rotational rate is to determined is rotating clockwise at an angular velocity of $\dot{\theta}$;

FIG. 4 is curves illustrating a typical phase comparison between a generated RF wave and an acoustic wave that has propagated through the sphere whose rotational rate is to be determined;

FIG. 5 is a schematic drawing of the present invention showing the path of a ray that has been reflected several times by the concave, inward facing surface of the sphere where the sphere is not rotating;

FIG. 6 is a graph comparing the amplitudes of acoustic waves for a sphere with $\dot{\theta} = 0$ and $\dot{\theta} > 0$, respectively, for multiple transits through the sphere; also shown is the noise level;

FIG. 7 is a graph comparing the amplitudes of acoustic waves for a sphere with $\dot{\theta} = 0$, $\dot{\theta} = \dot{\theta}_1$, and $\dot{\theta} = \dot{\theta}_2$, respectively, for multiple transits through the sphere; also shown is the noise level; and FIG. 8 is a schematic drawing showing three pairs of electrodes arranged to measure the orthogonal rotation rate components for a sphere rotating about three axes.

DESCRIPTION OF THE PREFERRED EMBODIMENTS

A cross section of the preferred embodiment of the present invention is shown in FIG. 1. Sphere 13 is the object whose rotation rate is to be determined and is shown cross-sectioned; it rotates in the plane of the page about an axis X that passes through its center (Axis X is perpendicular to the plane which includes the page.). Housing 15 is also shown cross-sectioned; it is radially positioned about sphere 13 and spaced a small distance s from it.

Sphere 13 is solid or liquid filled, and the material comprising its interior is preferably one having a high acoustic impedance, e.g., quartz. Space s preferably contains a vacuum or is filled with a gas having a low acoustic impedance.

Sphere 13 may be rotationally mounted in housing 15 by any of a number of conventional methods. Sphere 13 and housing 15 may be a conventional gyroscope and its accompanying housing, well known in the art; however, the concept is herein described in general terms as it is not limited to a gyroscopic device but may be used wherever it is desired to measure the rate of rotation of any spherical object rotating about its center. The present invention may also be used to measure the rotation rate of a cylinder rotating about its axis of revolution, although, as will be hereinafter explained, with less efficiency than when used with a sphere.

An RF voltage is supplied by RF voltage generator 23 to the input of pulser 24 which transforms the continuous input RF voltage into discrete pulses of the same frequency and amplitude characteristics. The output of pulser 24 is electrically connected to input electrode 17, which may include one or more electrodes, in any of several configurations well known in the art in order to establish RF electric fields in the spaces immediately adjacent to the opposite surface of sphere 13.

The material comprising sphere 13 is preferably piezoelectric or sphere 13 has its surface coated with a uniform piezoelectric film. Hence, the RF electric field generated by electrode 17 causes the local movement of the piezoelectric material in the peripheral region of sphere 13 located across from electrode 17. Such movement causes the formation of radially diverging acoustic wave 21 that propagates into the interior of sphere 13.

In essence, the combination of input electrode 17 and the adjacent piezoelectric material of sphere 13 forms an input acoustoelectric transducer which converts RF electrical energy into acoustic waves.

Generated acoustic wave 21 will propagate through sphere 13 and eventually impinge upon the entire surface of sphere 13. When wave 21 impinges upon a particular point on the surface of sphere 13, it will cause the local movement of piezoelectric material which will set up a local electromagnetic field in spaces. The impingement of each particular ray of wave 21 will occur at differing times, with the time differential depending on the respective path lengths of the rays.

Output electrode 19, which may include one or more electrodes, will sense the electromagnetic field in spaces caused by the impingement of wave 21 at the point on sphere 13 that is lying across from output electrode 19 at the moment of impingement. As shown in FIG. 1, output electrode 19 and the adjacent piezoelectric material on the surface of sphere 13 together form an output acoustoelectric transducer which functions to convert acoustical energy (from impinging acoustic wave 21) into electrical energy.

As may be noted from FIG. 1, no operative contact is made between sphere 13 and any other structure, nor does the present invention require the placement of any nonuniform structures or marks within or on its surface.

As an acoustic wave propagating through a rotating object will have its path relative to a non-rotating, stationary coordinate system altered by such rotation, i.e., an acoustic wave will rotate with the rotating object that it is traveling through as opposed to the propagation characteristics of an electromagnetic wave, the particular ray of wave 21 whose impingement will be sensed by output electrode 19 will depend upon the rotation rate, $\dot{\theta}$, of sphere 13.

This concept and its embodiment in the present invention can be best explained by referring to FIG. 2, a schematic drawing of the present invention wherein sphere 13 is stationary, i.e., $\dot{\theta} = 0$.

The plane of the page contains a great circle of sphere 13. Points A, B, and C are points fixed in space in the plane of the page and located adjacent to sphere 13. Sphere 13 has a diameter of magnitude $d$. Point P is at the center of sphere 13. A point source of acoustic waves is assumed located at point A, i.e., adjacent to the point at which input electrode 17 generates acoustic wave 21. Point B lies adjacent to the point on the surface of sphere 13 at which an impinging ray of acoustic wave 21 is sensed by output electrode 19. Point C lies adjacent to the point on the surface of sphere 13 where the ray of wave 21 which would impinge adjacent to point B if $\dot{\theta}$ were some determinate value greater than 0, instead impinges because $\dot{\theta} = 0$. Line AC shows the path of that ray, and $l$ is its path length. Line AB (a diameter of sphere 13) and triangle APC are stationary; they do not rotate with sphere 13.

Point C' is a point located on the surface of sphere 13 at which a ray of wave 21 traveling in the plane of the page at an angle $\alpha$ to line AB will impinge. There is a point C' and a point C for each ray, and point C' lies adjacent to point C when $\dot{\theta} = 0$.

FIG. 3 traces the path of the one ray of wave 21 that will impinge adjacent to point B and be sensed by transducer 19 when sphere 13 is rotating clockwise at angular velocity $\dot{\theta}$ (shown relative to a stationary coordinate system). Alternatively stated, the point C' of only one ray will lie adjacent to point B. As $\dot{\theta}$ increases, the particular ray which impinges adjacent to point B will have an increasing path angle $\alpha$, a decreasing path length $l$, and a decreasing transit time T, required to propagate to point C'.

From the geometry of FIG. 2, the following equations can be derived:

$$l = d \cos \alpha \tag{1}$$

$$\beta = 2\alpha \tag{2}$$

$$T = l/v \tag{3}$$

where $v$ is the acoustic velocity of propagation of wave 21 through the material of which sphere 13 is composed (assumed to be isotropic).

Equations (1), (2), and (3) apply whether sphere 13 is stationary or rotating. Assuming sphere 13 is rotating at a rate of $\dot{\theta}$, the transit time T to traverse length $l$ may also be obtained from:

$$T = \beta/\dot{\theta} \tag{4}$$

From equations (1) through (4), the following transcendental equation having two unknowns, $\dot{\theta}$ and T, can be derived:

$$T = (d/v)\cos(\dot{\theta}T/2) \tag{5}$$

As will be hereinafter discussed, the parameter T is directly obtained from phase comparator 25 of the present invention. $\dot{\theta}$ may then be obtained by solving equation (5) by graphical or computer methods well known in the art or by solving equation (5) for $\dot{\theta}$:

$$\dot{\theta} = (2/T)\cos^{-1}(vT/d) \tag{6}$$

Means for the solution of either equation (5) or (6) for $\dot{\theta}$ is indicated by reference numeral 26 of FIG. 1.

Referring to FIG. 1, the output of RF voltage generator 23 is also connected to an input terminal of phase comparator 25. The output of output electrode 19 is connected to a second input terminal of phase comparator 25. Transit time T is measured by comparing the phase of the RF voltage supplied by voltage generator 23 with the phase of acoustic wave 21 sensed by output electrode 19.

However, prior to the operative use of phase comparator 25, the input from RF voltage generator 23 must be biased because the transit time T can only be obtained by comparing the phase of acoustic wave 21 that has traversed sphere 13 with $\dot{\theta} > 0$ with the phase of wave 21 that has traversed with $\dot{\theta} = 0$. Thus, the proper bias is obtained by adjusting the phase of the input to comparator 25 from RF voltage generator 23 to that phase obtained from output electrode 19 with $\dot{\theta} = 0$. Such biasing will also properly compensate for various line losses and delays.

Phase comparator 25 may be a phase detector or oscilloscope, though it is not intended to limit the scope of the present invention to these stated alternatives. FIG. 4 illustrates how transit time T may be measured by gauging the phase differential Δ of wave 21 from the biased RF wave received from RF voltage generator 23 on a properly calibrated oscilloscope. It should be noted that the number of transits across sphere 13 must be the same for both of the waves being compared; the use of multiple transits obtained by internal reflection is discussed in detail below.

When $\dot{\theta}$ is relatively high, even a small change in $\dot{\theta}$ will result in a detectable phase differential Δ on phase detector 25. However, when $\dot{\theta}$ is relatively low, a small change in $\dot{\theta}$ cannot be gauged on phase detector 25 because such a change will result in only a very small change in path length $l$, transit time T, and, hence, provide but a miniscule phase differential Δ between impinging wave 21 and the RF wave from RF voltage generator 23. The same difficulty is encountered in measuring low values of $\dot{\theta}$. The common source of the problem is apparent from the plane geometry of the situation: as α approaches 90°, i.e., for high $\dot{\theta}$s, a small change in $\dot{\theta}$ will result in relatively significant changes in $l$ and T as compared to such changes for an identical change in $\dot{\theta}$ in the region where α approaches 0°, i.e., for low $\dot{\theta}$s.

This problem of low sensitivity for low $\dot{\theta}$s and to small rate changes at low $\dot{\theta}$s is solved by using multiple reflections of acoustic wave 21 to provide multiple transits in order to increase the differential in the transit time T, and thereby increase the phase differential Δ for such changes.

This concept and its embodiment in the present invention is illustrated in FIG. 5, a schematic drawing of the present invention showing the path of a ray of wave 21 that has been reflected several times by the concave inward facing surface of sphere 13 where sphere 13 is not rotating. The ray shown is that which will impinge adjacent to point B when sphere 13 is rotating clockwise at some determinate value of $\dot{\theta}$ (All reference letters are as hereinbefore defined with respect to FIGS. 2 and 3; N is the number of transits of the ray across sphere 13.).

As may be readily ascertained, the angle between a reflected ray and a radius drawn to the point of reflection will always be α, the path length $l$ between any pair of reflections will be d cos α, and the transit time T between any pair of reflections will be $(d/v)$ cos α. Therefore, every odd numbered reflection of the ray of wave 21 will impinge adjacent to point B and be sensed by electrode 19. If it is desired to sense the even numbered reflections, the functions of output electrode 19 may be assumed by appropriately modifying electrode 17.

When multiple transits are used, the total path length L is given by $$L = Nl \qquad (7)$$

where N is the number of transits. The transit time T becomes $$T = L/v. \qquad (8)$$

Assuming $\dot{\theta} > 0$, T may also be calculated from the expression $$T = N\beta/\dot{\theta}. \qquad (9)$$

From equations (1), (2), and (7) through (9) the following transcendental equation can be derived:

$$T = (Nd/v)\cos(\dot{\theta}T/2N). \qquad (10)$$

In the manner previously discussed, the T for a particular number of transits N is obtained from phase comparator 25. $\dot{\theta}$ may then be obtained by solving equation (10) by graphical or computer methods well known in the art or by solving equation (10) for $\dot{\theta}$:

$$\dot{\theta} = (2N/T)\cos^{-1}(vT/Nd). \qquad (11)$$

When multiple transits are used, reference numeral 26 of FIG. 1 represents means for calculating $\dot{\theta}$ by solving either equation (10) or (11).

FIG. 6 is a graph of the amplitudes of two acoustic waves sensed by electrode 19 and plotted versus time and the number of transits N. Each amplitude spike represents the amplitude at the midpoint of each received wave 21 or, alternatively, one must assume that wave 21 is of an infinitesimal length. The point is that graph 6 (and also graph 7) are presented for demonstrative purposes, as in real operation it would be difficult to obtain the discrete spikes as shown.

As indicated, the solid lined member of each pair represents the amplitude obtained for each respective reflection with $\dot{\theta} = 0$; the dashed line corresponds to the amplitude obtained with $\dot{\theta}$ at a relatively low value. The space δ between each pair is proportional to the time differential between their respective total transit times and, when more accurately measured by phase comparator 25 hereinbefore discussed in conjunction with FIG. 4, is the parameter used to measure $\dot{\theta}$. The graph shows that as N increases, the space δ between the two lines increases. This demonstrates the principle that as N is increased, the difference in the respective transit times for wave 21 with $\dot{\theta} = 0$ and with $\dot{\theta} > 0$ becomes easier to measure and this principle similarly applies when the measurement is obtained by comparing phases by means of phase comparator 25.

FIG. 7 is also a graph of amplitude vs time and N, but shows the amplitude for three waves: wave 21 for $\dot{\theta} = 0$, $\dot{\theta} = \dot{\theta}_1$, and $\dot{\theta} = \dot{\theta}_2$ with $\dot{\theta}_1$ and $\dot{\theta}_2$ being relatively low values. The graph shows that as N increases, the gap ξ between the respective spikes for $\dot{\theta}_1$ and $\dot{\theta}_2$ increases as does the space between each of them and the solid spike representing $\dot{\theta} = 0$ (δ₁ and δ₂, respectively). This demonstrates that as N increases the spacing between two such spikes becomes easier to measure and, therefore, the change in $\dot{\theta}$ becomes capable of being accurately measured.

In summary, FIG. 6 demonstrates that multiple transits, i.e., increasing N, become very useful when it is desired to measure low $\dot\theta$s; FIG. 7 shows that increasing N similarly aids in obtaining an accurate measurement of a small change in $\dot\theta$ when $\dot\theta$ is a relatively low value to begin with.

It should be noted, however, that the number of usable reflections is not infinite. The Nth signal generated by impinging wave 21, attenuated upon every reflection by absorption, must have an amplitude above the operative noise level in order to provide a cognizable signal.

The present invention may also be employed to measure the rotation rate of a cylinder rotating about its axis of revolution. However, when used with a cylinder the reflected acoustic wave 21 is focused in only two dimensions as compared to three in case of a sphere. As a result, wave 21 suffers attenuation due to diffraction in addition to that caused by absorption and the number of usable reflections is reduced from the number obtainable when the present invention is used with a sphere.

The present invention may also be used to measure rotation rate components of sphere 13 when it is rotating about more than one axis. Such an application requires three pairs of input and output electrodes with the components of each pair being connected to an RF voltage generator, a pulser, and a phase comparator as shown in FIG. 1 and hereinbefore discussed in reference to the pair comprised of input electrode 17 and output electrode 19. The respective outputs for all three of the phase comparators would be input into means 26 (as shown in FIG. 1) for the calculation of the individual rotation rate components. Means 26 would solve a set of simultaneous equations derivable by one skilled in the art from basic equations (1), (2), and (7) through (11) if multiple reflections are used, or (1) through (6) if the accuracy from only one transit is deemed adequate.

FIG. 8 is a schematic drawing showing the orientation of three pairs of electrodes, pairs E, F, and G, where it is desired to measure the rotation rate of sphere 13 about its center P along the orthogonal axes X, Y, and Z. As shown, a pair of electrodes should be located along each axis for which a rotation rate component is desired.

Another embodiment of the present invention uses Eddy currents to excite acoustic wave 21. Referring to FIG. 1, in such an embodiment reference numeral 17 is an input conductive coil which may include one or more conductive coils; reference numeral 19 is an output conductive coil which may include one or more conductive coils; and sphere 13, or at least its surface, is composed of a conductive material.

The output of pulser 24 is electrically connected to input coil 17 in one of several configurations well known in the art in order to generate a magnetic field in the spaces immediately adjacent to it and Eddy currents on the opposing surface of sphere 13. In essence, the combination of input coil 17 and the adjacent conductive material of sphere 13 constitutes an input Eddy current transducer which converts RF electrical energy into acoustic waves by using a magnetic field and Eddy currents.

Output coil 19 will sense the impingement of wave 21 at the adjacent point on the surface of sphere 13. Output coil 19 and the adjacent conductive material on the surface of sphere 13 together form an output Eddy current transducer which transforms acoustical energy (from impinging acoustic wave 21) into electrical energy.

The remaining operative aspects and referenced parts of this embodiment of the present invention remain as hereinbefore described with respect to embodiment 11.

A complete discussion of the mechanics and characteristics of Eddy currents is presented in "Electromagnetic, Noncontact Transducers," by R. B. Thompson, at page 385 of *Proceedings of the Conference on Sonics and Ultrasonics* (1973), and also in "An Electromagnetic Transducer for Generation and Detection of both Longitudinal and Transverse Ultrasonic waves," by Katsuhiro Kawashima, contained in *Oak Ridge National Report* No. ONRL-5064 (September, 1975).

What is claimed is:

1. An apparatus for measuring the rotation rate of a spherical object of an isotropic material about axes passing through its center comprising:
   a. means for exciting an acoustic wave at a first point on the surface of said object;
   b. means for sensing the arrival of said acoustic wave on the surface of said object at a second point diametrically opposite to said exciting means, said exciting means and said sensing means being spaced apart from said object;
   c. means for measuring the transit time required for said acoustic wave excited at said first point to propagate through said object to said second point; and
   d. means for computing said rotation rate as a function of said transit time according to the formula $$\dot\theta = (2/T)\cos^{-1}(vT/d)$$

where $\dot\theta$ is said rotation rate, T is said transit time, $v$ is the acoustic velocity of propagation of said acoustic wave through said object, and $d$ is the diameter of said object.

2. An apparatus for measuring the rotation rate of a spherical object of an isotropic material about axes passing through its center comprising:
   a. means for exciting an acoustic wave at a first point on the surface of said object;
   b. means for sensing the arrival of said acoustic wave on the surface of said object at a second point fixed relative to said exciting means, said exciting means and sensing means being spaced apart from said object;
   c. means for measuring the transit time required for said acoustic wave excited at said first point to propagate through said object ot said second point;
   d. means for computing said rotation rate as a function of said transit time; and
   a fluid surrounding said object, the acoustic impedance of said isotropic material being sufficiently greater than the acoustic impedance of said fluid to enable said acoustic wave to be inwardly reflected upon its impingement upon the inner surface of said object such that said acoustic wave is multiply reflected within said object such that said rotation rate of said object as computed by said computing means is a function of the transit time required by said acoustic wave to propagate through said object N times.

3. The rotation rate measuring apparatus recited in claim 2 including
   a housing radially encompassing and spaced apart from the periphery of said spherical object with said exciting means and said sensing means being located at first and second positions, respectively, in said housing.

4. The rotation rate measuring apparatus recited in claim 3 wherein:
 a. said spherical object has a surface composed of a piezoelectric material;
 b. said exciting means includes an RF voltage generator, a pulser, and at least one input electrode;
 c. said RF voltage generator being electrically connected to said pulser;
 d. said pulser being electrically connected to said at least one input electrode in a manner which enables RF electric fields to be generated at the surface of said spherical object; and
 e. said sensing means includes at least one output electrode.

5. The rotation rate measuring apparatus recited in claim 4 wherein
 a. the output of said RF voltage generator is applied to the input of said measuring means; and
 b. said at least one output electrode is electrically connected to said measuring means.

6. The rotation rate measuring apparatus as recited in claim 5 wherein said measuring means is a phase detector which measures said transit time by comparing the instantaneous RF phase of said RF voltage generator with the signal from said at least one output electrode.

7. The rotation rate measuring apparatus recited in claim 3 wherein:
 a. said spherical object has a surface composed of a conductive material;
 b. said exciting means includes an RF voltage generator, a pulser, and at least one input conductive coil;
 c. said RF voltage generator being electrically connected to said pulser;
 d. said pulser being electrically connected to said at least one input coil in a manner which enables Eddy currents to be generated on the surface of said spherical object; and
 e. said sensing means includes at least one output conductive coil.

8. The rotation rate measuring apparatus recited in claim 7 wherein:
 a. the output of said RF voltage generator is applied to the input of said measuring means; and
 b. said at least one output coil is electrically connected to said measuring means.

* * * * *